(12) United States Patent
Mukasa et al.

(10) Patent No.: US 11,899,239 B2
(45) Date of Patent: Feb. 13, 2024

(54) OPTICAL FIBER

(71) Applicant: FURUKAWA ELECTRIC CO., LTD., Tokyo (JP)

(72) Inventors: Kazunori Mukasa, Tokyo (JP); Shugo Takeuchi, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 17/930,547

(22) Filed: Sep. 8, 2022

(65) Prior Publication Data

US 2023/0020502 A1     Jan. 19, 2023

Related U.S. Application Data

(63) Continuation of application No. PCT/JP2021/010704, filed on Mar. 16, 2021.

(30) Foreign Application Priority Data

Mar. 27, 2020   (JP) ................................. 2020-057392

(51) Int. Cl.
*G02B 6/036*   (2006.01)
*G02B 6/02*   (2006.01)

(52) U.S. Cl.
CPC ........ *G02B 6/0365* (2013.01); *G02B 6/02214* (2013.01)

(58) Field of Classification Search
CPC ........................... G02B 6/02214; G02B 6/0365
See application file for complete search history.

(56) References Cited

U.S. PATENT DOCUMENTS 7,164,835 B2 *   1/2007   Matsuo ............. G02B 6/03672
                                                          385/127
7,574,088 B2 *   8/2009   Sugizaki ............ G02B 6/03627
                                                          385/100
(Continued)

FOREIGN PATENT DOCUMENTS

JP        2012-27454 A    2/2012
JP        2012-514772 A   6/2012
(Continued)

OTHER PUBLICATIONS

Indian Office Action dated Jan. 11, 2023 in Indian Application 202247053428, 5 pages.

(Continued)

*Primary Examiner* — Ryan A Lepisto
(74) *Attorney, Agent, or Firm* — Oblon, McClelland, Maier & Neustadt, L.L.P.

(57) ABSTRACT

An optical fiber includes: a central core portion; an intermediate layer configured to surround an outer periphery of the central core portion; a trench layer configured to surround an outer periphery of the intermediate layer; and a cladding portion configured to surround an outer periphery of the trench layer. The central core portion is made of silica based glass that does not contain germanium (Ge). $\Delta 1 > \Delta 2 > \Delta 3$ and $\Delta Clad > \Delta 3$, where $\Delta 1$ represents an average maximum relative refractive-index difference of the central core portion relative to pure quartz glass, $\Delta 2$ represents an average relative refractive-index difference of the intermediate layer relative to the pure quartz glass, $\Delta 3$ represents an average relative refractive-index difference of the trench layer relative to the pure quartz glass, and $\Delta Clad$ represents an average relative refractive-index difference of the cladding portion relative to the pure quartz glass. $\Delta 1$ is equal to or larger than 0.05%.

9 Claims, 2 Drawing Sheets

(56) References Cited

U.S. PATENT DOCUMENTS

| | | | |
|---|---|---|---|
| 7,583,878 B2* | 9/2009 | Sugizaki | G02B 6/4436 385/127 |
| 8,081,856 B2* | 12/2011 | Nakanishi | G02B 6/4433 385/100 |
| 8,837,891 B2* | 9/2014 | Oyamada | G02B 6/0283 385/124 |
| 8,995,803 B2* | 3/2015 | Bickham | G02B 6/268 385/27 |
| 11,314,017 B2* | 4/2022 | Mukasa | G02B 6/0365 |
| 11,506,837 B2* | 11/2022 | Mukasa | G02B 6/0365 |
| 11,714,228 B2* | 8/2023 | Mukasa | G02B 6/02238 385/124 |
| 11,714,229 B2* | 8/2023 | Mukasa | C03B 37/014 385/127 |
| 11,719,879 B2* | 8/2023 | Mukasa | G02B 6/02009 385/123 |
| 2002/0097970 A1 | 7/2002 | Sasaoka | |
| 2010/0178504 A1 | 7/2010 | Chen et al. | |
| 2012/0051703 A1 | 3/2012 | Bigot-Astruc et al. | |
| 2013/0272669 A1* | 10/2013 | Oyamada | G02B 6/03644 385/126 |
| 2016/0109651 A1 | 4/2016 | Borel et al. | |
| 2016/0304392 A1 | 10/2016 | Bookbinder et al. | |
| 2017/0003445 A1 | 1/2017 | Bookbinder et al. | |
| 2017/0146733 A1 | 5/2017 | Wood | |

FOREIGN PATENT DOCUMENTS

| | | | | |
|---|---|---|---|---|
| JP | 2016-81067 A | 5/2016 | | |
| JP | 2018-516386 A | 6/2018 | | |
| JP | 2018-525661 A | 9/2018 | | |
| WO | WO 2000-042458 A1 | 7/2000 | | |
| WO | WO-2010093187 A2 * | 8/2010 | .......... | G02B 6/0365 |
| WO | 2019/172022 A1 | 9/2019 | | |

OTHER PUBLICATIONS

International Search Report dated Jun. 8, 2021 in PCT/JP2021/010704 filed on Mar. 16, 2021, 2 pages.

Chinese office action dated Nov. 25, 2023 in Chinese Application No. 202180024028.7, with English machine translation, 15 pages.

* cited by examiner

OPTICAL FIBER

This application is a continuation of International Application No. PCT/JP2021/010704, filed on Mar. 16, 2021 which claims the benefit of priority of the prior Japanese Patent Application No. 2020-057392, filed on Mar. 27, 2020, the entire contents of which are incorporated herein by reference.

BACKGROUND

The present disclosure relates to an optical fiber.

Various technologies for realizing certain characteristics such as a low transmission loss and a low bending loss in an optical fiber have been disclosed. For example, International Publication No. 00/042458 and Japanese Translation of PCT International Application Publication No. 2018-516386 disclose technologies for realizing a low transmission loss by adopting a simple refractive index profile or a W-shaped refractive index profile and adjusting a dopant to be added to a core portion such that a refractive index approaches a refractive index of pure quartz glass. Further, Japanese Laid-open Patent Publication No. 2012-027454 discloses a technology for realizing a low bending loss by adopting a trench-type refractive index profile and relatively reducing a refractive index of a trench layer.

However, it is difficult to simultaneously adopt the technology for bringing a refractive index of the core portion closer to the refractive index of the pure quartz glass and the technology for reducing the refractive index of the trench layer. In contrast, Japanese Translation of PCT International Application Publication No. 2012-514772 discloses a technology for realizing a low bending loss by adopting a trench-type refractive index profile and co-doping fluorine (F) and boron (B) in the trench layer.

Meanwhile, as the standard related to a low bending loss of an optical fiber, the standard defined by ITU-T (International Telecommunication Union Telecommunication Standardization Sector) G.657 (hereinafter, may be described as the G.657 standard or the like) is known. For example, the G.657.A1 standard defines that a bending loss at a wavelength of 1550 nanometers (nm) when bending is made at a diameter of 20 millimeters (mm) is equal to or smaller than 0.75 dB/turn.

SUMMARY

In the technology for co-doping F and B in the trench layer, a manufacturing process becomes complicated, so that a level of difficulty in manufacturing the optical fiber increases.

There is a need for an optical fiber that can easily realize a low transmission loss and a low bending loss and that can easily be manufactured.

According to one aspect of the present disclosure, there is provided an optical fiber including: a central core portion; an intermediate layer configured to surround an outer periphery of the central core portion; a trench layer configured to surround an outer periphery of the intermediate layer; and a cladding portion configured to surround an outer periphery of the trench layer, wherein the central core portion is made of silica based glass that does not contain germanium (Ge), $\Delta 1 > \Delta 2 > \Delta 3$ and $\Delta Clad > \Delta 3$, where $\Delta 1$ represents an average maximum relative refractive-index difference of the central core portion relative to pure quartz glass, $\Delta 2$ represents an average relative refractive-index difference of the intermediate layer relative to the pure quartz glass, $\Delta 3$ represents an average relative refractive-index difference of the trench layer relative to the pure quartz glass, and $\Delta Clad$ represents an average relative refractive-index difference of the cladding portion relative to the pure quartz glass, $\Delta 1$ is equal to or larger than 0.05%, the intermediate layer, the trench layer, and the cladding portion are made of silica based glass that is doped with only fluorine (F) and chlorine (Cl), a core diameter of the central core portion is equal to or larger than 7.7 μm and equal to or smaller than 8.7 μm, a mode field diameter at a wavelength of 1310 nm is equal to or larger than 8.6 μm and equal to or smaller than 9.2 μm, a cable cutoff wavelength is equal to or smaller than 1260 nm, and a transmission loss at a wavelength of 1550 nm is equal to or smaller than 0.18 dB/km.

DETAILED DESCRIPTION

An embodiment of the present disclosure will be described in detail below with reference to the drawings. The present disclosure is not limited by the embodiment described below. Further, in each of the drawings, the same or corresponding components are appropriately denoted by the same reference symbols. Furthermore, in the present specification, a cutoff wavelength or an effective cutoff wavelength indicates a cable cutoff wavelength that is defined by ITU-T G.650.1. Moreover, other terms that are not specifically defined in the present specification conform to definitions and measurement methods described in G.650.1 and G.650.2.

Figure 1:
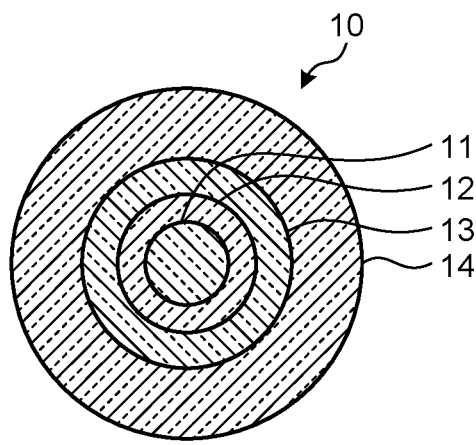
FIG. 1 is a schematic cross-sectional view of an optical fiber according to an embodiment.

FIG. 1 is a schematic cross-sectional view of an optical fiber according to the embodiment. An optical fiber 10 is made of silica based glass and includes a central core portion 11, an intermediate layer 12 that surrounds an outer periphery of the central core portion 11, a trench layer 13 that surrounds an outer periphery of the intermediate layer 12, and a cladding portion 14 that surrounds an outer periphery of the trench layer 13. Meanwhile, the optical fiber 10 may include a cover layer that surrounds an outer periphery of the cladding portion 14.

Figure 2:
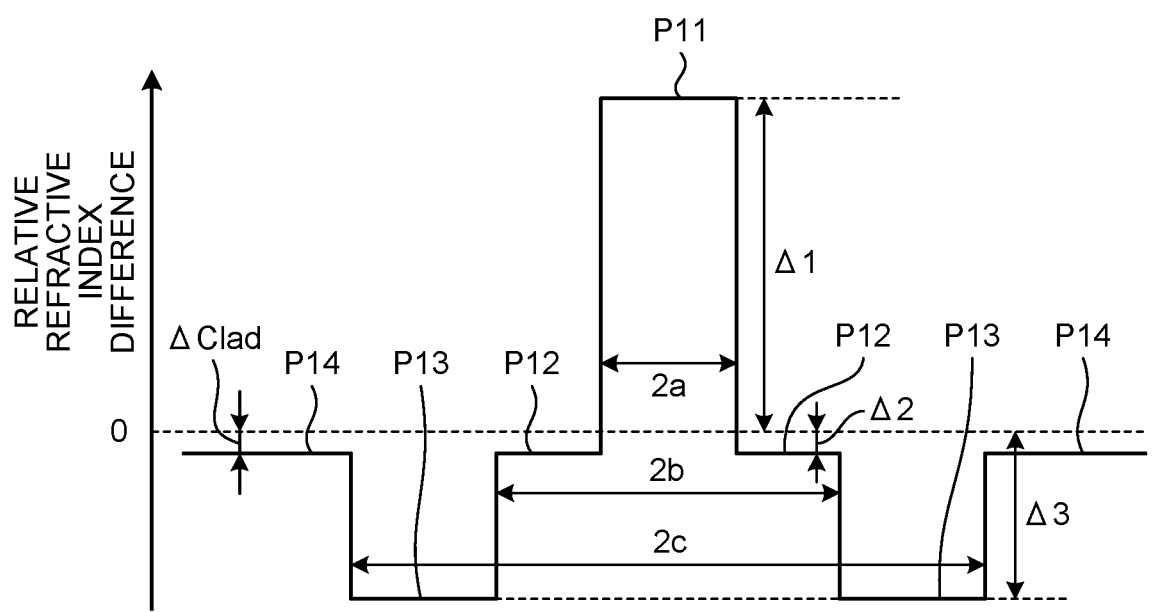
FIG. 2 is a schematic diagram of a refractive index profile of the optical fiber according to the embodiment.

FIG. 2 is a diagram illustrating a refractive index profile of the optical fiber 10. A profile P11 is a refractive index profile of the central core portion 11 and has what is called a step type. A profile P12 is a refractive index profile of the intermediate layer 12. A profile P13 is a refractive index profile of the trench layer 13. A profile P14 is a refractive index profile of the cladding portion 14.

Here, the refractive index profile of the central core portion 11 does not always have the step type that is a geometrically ideal shape, but may have a certain shape in which a top portion does not have a flat shape and a concave or a convex is formed due to manufacturing characteristics or a certain shape in which a hem is pulled from the top portion. In this case, a refractive index in a certain region that is approximately flat in the top portion of the refractive index profile within a manufacturing design range of a core diameter $2a$ of the central core portion 11 serves as an index for determining $\Delta 1$.

Structural parameters of the optical fiber 10 will be described below. As described above, the core diameter of the central core portion 11 is denoted by 2a. Further, an outer diameter of the intermediate layer 12, in other words, an inner diameter of the trench layer 13 is denoted by 2b, and an outer diameter of the trench layer 13 is denoted by 2c. Therefore, a width (trench width) of the trench layer 13 is (c-b).

Furthermore, a relative refractive-index difference (maximum relative refractive-index difference) of an average maximum refractive index of the central core portion 11 relative to the refractive index of the pure quartz glass is Δ1. An average relative refractive-index difference of the refractive index of the intermediate layer 12 relative to the refractive index of the pure quartz glass is Δ2. An average relative refractive-index difference of the refractive index of the trench layer 13 relative to the refractive index of the pure quartz glass is Δ3. An average relative refractive-index difference of the refractive index of the cladding portion 14 relative to the refractive index of the pure quartz glass is ΔClad. Here, the pure quartz glass is extremely-high-purity quartz glass that does not substantially contain a dopant that changes the refractive index and that has a refractive index of about 1.444 at a wavelength of 1550 nm.

As for Δ1, Δ2, Δ3, and ΔClad, Δ1>Δ2>Δ3 and ΔClad>Δ3. In other words, the optical fiber 10 has a trench-type refractive index profile. Further, in the present embodiment, ΔClad is smaller than 0%.

Constituent materials of the optical fiber 10 will be described below. The central core portion 11 is made of silica based glass that does not contain germanium (Ge) that is normally used as a refractive index adjustment dopant for increasing the refractive index. For example, the central core portion 11 contains at least one, for example, two or more of chlorine (Cl), fluorine (F), potassium (K), and sodium (Na) as dopants. F is a dopant that reduces a refractive index of quartz glass, and Cl, K, and Na are dopants that increase the refractive index of quartz glass. By adjusting the refractive index by using one of the dopants as described above or a combination of two or more of the dopants as described above, it is possible to achieve Δ1 equal to or larger than 0.05% in the central core portion 11. The dopants that achieves Δ1 equal to or larger than 0.05% are not limited to the dopants as described above, but it is preferable not to use a dopant, such as Ge, that increases Rayleigh scattering.

In contrast, the intermediate layer 12, the trench layer 13, and the cladding portion 14 are made of silica based glass that is doped with only F and Cl. By adjusting the refractive indices by using the dopants as described above, it is possible to achieve Δ1 equal to or larger than 0.05% in the central core portion 11. The refractive indices are adjusted by the dopants as described above such that Δ1>Δ2>Δ3 and ΔClad>Δ3.

The optical fiber 10 according to the present embodiment includes the central core portion 11 for which Δ1 is equal to or larger than 0.05% that is relatively low, so that it is possible to relatively reduce a Rayleigh scattering loss and it is possible to easily reduce a transmission loss. Furthermore, the optical fiber 10 is a trench type in which the refractive index profile is set such that Δ1>Δ2>Δ3 and ΔClad>Δ3, and the intermediate layer 12, the trench layer 13, and the cladding portion 14 are made of silica based glass that is doped with only F and Cl; therefore, it is possible to easily realize a low bending loss and simplify manufacturing.

The central core portion 11, the intermediate layer 12, the trench layer 13, and the cladding portion 14 may be configured to contain the dopants as described above by manufacturing an optical fiber preform by a well-known method using a vapor axial deposition (VAD) method, an outside vapor deposition (OVD) method, or the like, and manufacturing the optical fiber 10 from the optical fiber preform. For example, with respect to the dopants such as F, K, and Na, the dopants may be added to the optical fiber preform by using a gas containing the dopants at the time of soot synthesis. Furthermore, Cl may be added to the optical fiber preform by causing a chlorine gas used in a dehydration process to remain. Moreover, F may be added to the optical fiber preform by causing a fluorine gas to flow into a glass sintered structure.

Meanwhile, if Δ1 of the central core portion 11 is smaller than 0.05%, it is possible to more easily reduce the transmission loss, but the refractive index of the trench layer 13 needs to be further reduced to realize a low bending loss, which makes manufacturing difficult.

In the optical fiber 10, for example, it is possible to achieve a transmission loss equal to or smaller than 0.18 dB/km at a wavelength of 1550 nm. Further, in the optical fiber 10, for example, it is possible to achieve a bending loss equal to or smaller than 0.75 dB/turn at a wavelength of 1550 nm when bending is made at a diameter of 20 mm, which meets the G.657.A1 standard. Meanwhile, in the following description, the bending loss at a wavelength of 1550 nm when bending is made at a diameter of 20 mm may be simply referred to as a bending loss.

Moreover, in the optical fiber 10, it is possible to achieve a mode field diameter (MF) equal to or larger than 8.6 μm and equal to or smaller than 9.2 μm at a wavelength of 1310 nm and a cable cutoff wavelength (λcc) equal to or smaller than 1260 nm. With this configuration, the optical fiber 10 is highly compatible with the 6.652 standard or the G657 standard with respect to MFD and λcc. In this case, it is preferable to set the core diameter 2a of the central core portion 11 such that the cable cutoff wavelength is equal to or larger than 1000 nm and equal to or smaller than 1260 nm. Furthermore, it is preferable that the cable cutoff wavelength is equal to or larger than 1000 nm from the viewpoint of reducing a macro-bending loss.

A condition on Δ1 and ΔClad for the optical fiber 10 to meet the optical characteristics as described above is that Δ1-ΔClad is equal to or larger than 0.34% and equal to or smaller than 0.40%, for example.

The optical fiber according to the embodiment will be described below with reference to results of simulation calculations.

Figure 3:
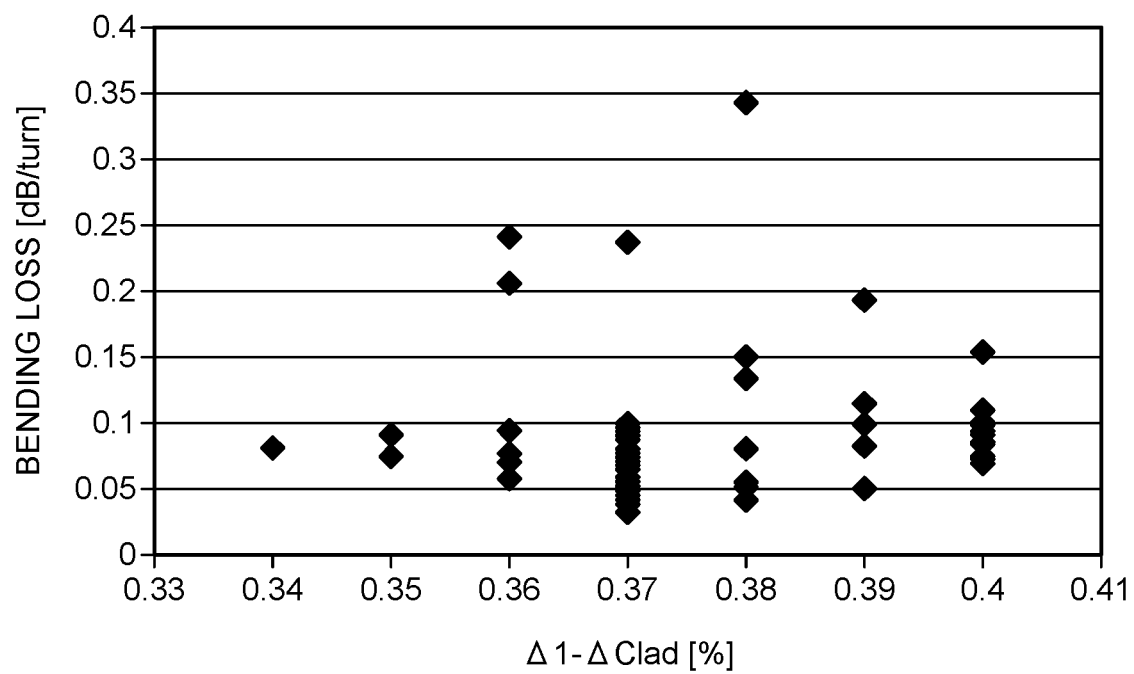
FIG. 3 is a diagram illustrating an example of a relationship between ($\Delta 1$-$\Delta Clad$) and a bending loss.

FIG. 3 is a diagram illustrating an example of a relationship between (Δ1-ΔClad) and a bending loss. FIG. 3 illustrates results of calculations of optical characteristics by setting Δ1-ΔClad to various values equal to or larger than 0.34% and equal to or smaller than 0.40% and by comprehensively changing parameters, such as Δ2, Δ3, 2a, b/a, and c/a, to various values and combining the parameters.

As illustrated in FIG. 3, it was confirmed that, when Δ1-ΔClad is equal to or larger than 0.34% and equal to or smaller than 0.40%, it is possible to achieve a bending loss equal to or smaller than 0.75 dB/turn, and in particular, a bending loss equal to or smaller than 0.1 dB/turn that meets the G.657.Δ2 standard, in various combinations of the parameters. Furthermore, to achieve a bending loss equal to or smaller than 0.75 dB/turn, for example, it was confirmed that it is preferable that |Δ3-ΔClad| is equal to or smaller than 0.25%, Δ2-ΔClad is equal to or larger than −0.05% and equal to or smaller than 0.05%, b/a is equal to or larger than 1.8 and equal to or smaller than 4.0, or c/a is equal to or larger than 3.4 and equal to or smaller than 7.0.

Moreover, under the preferable condition to achieve a bending loss equal to or smaller than 0.75 dB/turn, the following characteristics were frequently obtained: a zero-dispersion wavelength is equal to or larger than 1300 nm and equal to or smaller than 1324 nm, a dispersion slope at a zero-dispersion wavelength is equal to or smaller than 0.092 ps/nm$^2$/km, and the dispersion slope is equal to or larger than 0.073 ps/nm$^2$/km. The characteristics as described above are highly compatible with the G.652 standard or the G657 standard.

Furthermore, Table 1 and Table 2 indicate measurement results of a transmission loss, a bending loss, MFD, and λcc of optical fibers with sample numbers No. 1 to 34, which are manufactured by combinations of various values of Δ1, Δ2, Δ3, ΔClad, b/a, c/a, and 2a. Meanwhile, a core dopant that is added to the core portion is also set in various ways. For example, $Cl_2$+F indicates a case in which chlorine and fluorine are used as the core dopant, and K+Na+$Cl_2$ indicates a case in which potassium, sodium, and chlorine are used as the core dopant.

As illustrated in Table 1 and Table 2, it is possible to achieve preferable characteristics as follows: Δ1 is equal to or larger than 0.05%, ΔClad is smaller than 0%, b/a is equal to or larger than 1.8 and equal to or smaller than 4.0, c/a is equal to or larger than 3.4 and equal to or smaller than 7.0, Δ1-ΔClad is equal to or larger than 0.34% and equal to or smaller than 0.40%, |Δ3-ΔClad| is equal to or smaller than 0.26%, Δ2-ΔClad is equal to or larger than −0.05% and equal to or smaller than 0.05%, a central core diameter is equal to or larger than 7.7 μm and equal to or smaller than 8.7 μm, Δ2 is equal to or larger than −0.32% and equal to or smaller than −0.19%, Δ3 is equal to or larger than −0.55% and equal to or smaller than −0.39%, ΔClad is equal to or larger than −0.32% and equal to or smaller than −0.19%, a transmission loss is equal to or smaller than 0.18 dB/km, a bending loss is equal to or smaller than 1.6 dB/m, that is, equal to or smaller than 0.75 dB/turn, MFD is equal to or larger than 8.6 μm and equal to or smaller than 9.2 μm, and λcc is equal to or larger than 1000 nm and equal to or smaller than 1260 nm. Meanwhile, Δ3 is equal to or larger than −0.55%, which makes it possible to relatively reduce an amount of F to be added and makes addition of F easy.

The values listed in Table 1 and Table 2 are clearly indicated in the specifications as represented by examples below. With regard to the sample numbers other than the sample numbers described as the examples below, the values described in Table 1 and Table 2 are described in the specifications in the same manner as below.

Specifically, with respect to the sample number "No. 19" in Table 2 for example, Δ1 is 0.12%, Δ2 is −0.25%, Δ3 is −0.43%, ΔClad is −0.25%, Δ1-ΔClad is 0.37%, Δ2-ΔClad is 0%, |Δ3-ΔClad| is 0.18%, b/a is 2.2, c/a is 4, 2a is 8.3 μm, a core dopant is chlorine ($Cl_2$), a transmission loss at a wavelength of 1550 nm is 0.17 dB/km, a bending loss at a wavelength of 1550 when bending is made at a diameter of 20 mm is 1.1 dB/m, MFD is 8.82 μm, and λcc is 1248 nm.

Furthermore, with respect to the sample number "No. 20" for example, Δ1 is 0.08%, Δ2 is −0.29%, Δ3 is −0.45%, ΔClad is −0.29%, Δ1-ΔClad is 0.37%, Δ2-ΔClad is 0%, |Δ3-ΔClad| is 0.16%, b/a is 2.2, c/a is 4, 2a is 8.3 μm, a core dopant is $Cl_2$, a transmission loss at a wavelength of 1550 nm is 0.17 dB/km, a bending loss at a wavelength of 1550 nm when bending is made at a diameter of 20 mm is 1.6 dB/m, MFD is 8.83 μm, and λcc is 1241 nm.

Moreover, with respect to the sample number "No. 27" for example, Δ1 is 0.09%, Δ2 is −0.28%, Δ3 is −0.4%, ΔClad is −0.28%, Δ1-ΔClad is 0.37%, Δ2-ΔClad is 0%, |Δ3-ΔClad| is 0.12%, b/a is 3, c/a is 5, 2a is 8.2 μm, a core dopant is $Cl_2$, a transmission loss at a wavelength of 1550 nm is 0.166 dB/km, a bending loss at a wavelength of 1550 nm when bending is made at a diameter of 20 mm is 1.5 dB/m, MFD is 8.84 μm, and λcc is 1250 nm.

TABLE 1

| Item Sample No. | Δ1 [%] | Δ2 [%] | Δ3 [%] | ΔClad [%] | Δ1 − ΔClad [%] | Δ2 − ΔClad [%] | |Δ3 − ΔClad| [%] | b/a | c/a | 2a [μm] | Core dopant | Transmission loss @1550 nm [dB/km] | Bending loss @1550 nm, 20 mm [dB/m] | MFD @1310 nm [μm] | λcc [nm] |
|---|---|---|---|---|---|---|---|---|---|---|---|---|---|---|---|
| No. 1 | 0.09 | −0.3 | −0.5 | −0.3 | 0.39 | 0 | 0.2 | 3 | 4 | 8.2 | $Cl_2$ | 0.168 | 1.3 | 8.68 | 1256 |
| No. 2 | 0.07 | −0.3 | −0.5 | −0.3 | 0.37 | 0 | 0.2 | 2.6 | 4 | 8.3 | $Cl_2$ + F | 0.163 | 1.6 | 8.86 | 1248 |
| No. 3 | 0.06 | −0.31 | −0.51 | −0.31 | 0.37 | 0 | 0.2 | 2.4 | 4 | 8.3 | K | 0.157 | 1.2 | 8.84 | 1249 |
| No. 4 | 0.1 | −0.27 | −0.47 | −0.27 | 0.37 | 0 | 0.2 | 2.2 | 4 | 8.3 | K + $Cl_2$ | 0.154 | 0.9 | 8.82 | 1255 |
| No. 5 | 0.07 | −0.3 | −0.5 | −0.3 | 0.37 | 0 | 0.2 | 2 | 4 | 8 | Na | 0.166 | 1.3 | 8.64 | 1213 |
| No. 6 | 0.12 | −0.25 | −0.45 | −0.25 | 0.37 | 0 | 0.2 | 2 | 4 | 8.2 | Na + $Cl_2$ | 0.162 | 1 | 8.73 | 1243 |
| No. 7 | 0.13 | −0.24 | −0.44 | −0.24 | 0.37 | 0 | 0.2 | 3 | 4.6 | 8 | K + Na + $Cl_2$ | 0.158 | 1.4 | 8.73 | 1230 |
| No. 8 | 0.05 | −0.32 | −0.52 | −0.32 | 0.37 | 0 | 0.2 | 3 | 4.6 | 8.1 | K + F | 0.155 | 1.3 | 8.76 | 1247 |
| No. 9 | 0.06 | −0.31 | −0.51 | −0.31 | 0.37 | 0 | 0.2 | 3 | 4.8 | 8 | Na + F | 0.165 | 0.9 | 8.71 | 1249 |
| No. 10 | 0.07 | −0.3 | −0.5 | −0.3 | 0.37 | 0 | 0.2 | 3 | 5 | 7.9 | $Cl_2$ + F + K | 0.152 | 0.9 | 8.72 | 1253 |
| No. 11 | 0.1 | −0.32 | −0.47 | −0.27 | 0.37 | −0.05 | 0.2 | 3 | 4 | 8.7 | $Cl_2$ | 0.169 | 1.5 | 8.71 | 1246 |
| No. 12 | 0.09 | −0.27 | −0.47 | −0.27 | 0.36 | 0 | 0.2 | 2.2 | 4 | 8.4 | $Cl_2$ | 0.17 | 1.1 | 8.94 | 1255 |
| No. 13 | 0.1 | −0.25 | −0.45 | −0.25 | 0.35 | 0 | 0.2 | 2.2 | 4 | 8.5 | $Cl_2$ | 0.168 | 1.5 | 9.05 | 1255 |
| No. 14 | 0.15 | −0.24 | −0.44 | −0.24 | 0.39 | 0 | 0.2 | 2.2 | 4 | 8.1 | $Cl_2$ | 0.174 | 0.8 | 8.6 | 1255 |
| No. 15 | 0.12 | −0.27 | −0.45 | −0.25 | 0.37 | −0.02 | 0.2 | 2.2 | 4 | 8.3 | $Cl_2$ | 0.171 | 0.9 | 8.69 | 1238 |
| No. 16 | 0.11 | −0.3 | −0.46 | −0.26 | 0.37 | −0.04 | 0.2 | 2.2 | 4 | 8.5 | $Cl_2$ | 0.17 | 0.7 | 8.66 | 1251 |
| No. 17 | 0.1 | −0.25 | −0.47 | −0.27 | 0.37 | 0.02 | 0.2 | 2.2 | 4 | 8.2 | $Cl_2$ | 0.169 | 1.2 | 8.92 | 1255 |

TABLE 2

| Item Sample No. | Δ1 [%] | Δ2 [%] | Δ3 [%] | ΔClad [%] | Δ1 − ΔClad [%] | Δ2 − ΔClad [%] | \|Δ3 − ΔClad\| [%] | b/a | c/a | 2a [μm] | Core dopant | Transmission loss @1550 nm [dB/km] | Bending loss @1550 nm, 20 mm [dB/m] | MFD @1310 nm [μm] | λcc [nm] |
|---|---|---|---|---|---|---|---|---|---|---|---|---|---|---|---|
| No. 18 | 0.11 | −0.22 | −0.46 | −0.26 | 0.37 | 0.04 | 0.2 | 2.2 | 4 | 7.9 | Cl$_2$ | 0.17 | 1.4 | 8.95 | 1246 |
| No. 19 | 0.12 | −0.25 | −0.43 | −0.25 | 0.37 | 0 | 0.18 | 2.2 | 4 | 8.3 | Cl$_2$ | 0.17 | 1.1 | 8.82 | 1248 |
| No. 20 | 0.08 | −0.29 | −0.45 | −0.29 | 0.37 | 0 | 0.16 | 2.2 | 4 | 8.3 | Cl$_2$ | 0.17 | 1.6 | 8.83 | 1241 |
| No. 21 | 0.05 | −0.32 | −0.48 | −0.32 | 0.37 | 0 | 0.16 | 2.2 | 4 | 8.4 | Cl$_2$ | 0.179 | 1.5 | 8.87 | 1256 |
| No. 22 | 0.07 | −0.3 | −0.52 | −0.3 | 0.37 | 0 | 0.22 | 2.2 | 4 | 8.2 | Cl$_2$ | 0.173 | 0.9 | 8.77 | 1249 |
| No. 23 | 0.06 | −0.31 | −0.55 | −0.31 | 0.37 | 0 | 0.24 | 2.2 | 4 | 8.2 | Cl$_2$ | 0.175 | 0.8 | 8.77 | 1256 |
| No. 24 | 0.14 | −0.23 | −0.49 | −0.23 | 0.37 | 0 | 0.26 | 2.2 | 4 | 8.1 | Cl$_2$ | 0.171 | 0.8 | 8.72 | 1251 |
| No. 25 | 0.13 | −0.21 | −0.41 | −0.21 | 0.34 | −0.02 | 0.2 | 3 | 5 | 8.2 | Cl$_2$ | 0.169 | 1.3 | 9.09 | 1259 |
| No. 26 | 0.12 | −0.27 | −0.45 | −0.25 | 0.37 | 0 | 0.2 | 3 | 5 | 8 | Cl$_2$ | 0.169 | 0.5 | 8.61 | 1251 |
| No. 27 | 0.09 | −0.28 | −0.4 | −0.28 | 0.37 | 0 | 0.12 | 3 | 5 | 8.2 | Cl$_2$ | 0.166 | 1.5 | 8.84 | 1250 |
| No. 28 | 0.08 | −0.29 | −0.51 | −0.29 | 0.37 | 0 | 0.22 | 3 | 5 | 7.8 | Cl$_2$ | 0.169 | 0.6 | 8.69 | 1250 |
| No. 29 | 0.07 | −0.3 | −0.54 | −0.3 | 0.37 | 0 | 0.24 | 3 | 5 | 7.7 | Cl$_2$ | 0.174 | 0.5 | 8.65 | 1247 |
| No. 30 | 0.14 | −0.23 | −0.43 | −0.23 | 0.37 | 0 | 0.2 | 2.8 | 5 | 7.8 | Cl$_2$ | 0.171 | 0.7 | 8.68 | 1249 |
| No. 31 | 0.15 | −0.22 | −0.42 | −0.22 | 0.37 | 0 | 0.2 | 2.2 | 5 | 7.9 | Cl$_2$ | 0.175 | 1.2 | 8.73 | 1240 |
| No. 32 | 0.16 | −0.21 | −0.41 | −0.21 | 0.37 | 0 | 0.2 | 1.9 | 3.9 | 8.3 | Cl$_2$ | 0.173 | 1 | 8.73 | 1250 |
| No. 33 | 0.17 | −0.2 | −0.4 | −0.2 | 0.37 | 0 | 0.2 | 2.1 | 4.3 | 8.1 | Cl$_2$ | 0.175 | 0.7 | 8.68 | 1249 |
| No. 34 | 0.18 | −0.19 | −0.39 | −0.19 | 0.37 | 0 | 0.2 | 1.9 | 4.1 | 8.2 | Cl$_2$ | 0.177 | 0.5 | 8.65 | 1250 |

Meanwhile, the present disclosure is not limited by the embodiment as described above. The present disclosure includes configurations made by appropriately combining the structural elements as described above. Further, additional advantages and modifications will readily occur to those skilled in the art. Therefore, the disclosure in its broader aspects is not limited to the embodiment as described above, and various modifications may be made.

An optical fiber according to the present disclosure is preferably applied to a field of optical communication, such as data communication and telecommunication.

According to the present disclosure, it is possible to realize an optical fiber that can easily realize a low transmission loss and a low bending loss and that can easily be manufactured.

What is claimed is:

1. An optical fiber comprising:
   a central core portion;
   an intermediate layer configured to surround an outer periphery of the central core portion;
   a trench layer configured to surround an outer periphery of the intermediate layer; and
   a cladding portion configured to surround an outer periphery of the trench layer, wherein
   the central core portion is made of silica based glass that does not contain germanium (Ge),
   Δ1>Δ2>Δ3 and ΔClad>Δ3, where Δ1 represents an average maximum relative refractive-index difference of the central core portion relative to pure quartz glass, Δ2 represents an average relative refractive-index difference of the intermediate layer relative to the pure quartz glass, Δ3 represents an average relative refractive-index difference of the trench layer relative to the pure quartz glass, and ΔClad represents an average relative refractive-index difference of the cladding portion relative to the pure quartz glass,
   Δ1 is equal to or larger than 0.05%,
   the intermediate layer, the trench layer, and the cladding portion are made of silica based glass that is doped with only fluorine (F) and chlorine (Cl),
   a core diameter of the central core portion is equal to or larger than 7.7 μm and equal to or smaller than 8.7 μm,
   a mode field diameter at a wavelength of 1310 nm is equal to or larger than 8.6 μm and equal to or smaller than 9.2 μm,
   a cable cutoff wavelength is equal to or smaller than 1260 nm, and
   a transmission loss at a wavelength of 1550 nm is equal to or smaller than 0.18 dB/km.

2. The optical fiber according to claim 1, wherein ΔClad is smaller than 0%.

3. The optical fiber according to claim 1, wherein a bending loss at a wavelength of 1550 nm when bending is made at a diameter of 20 mm is equal to or smaller than 0.75 dB/turn.

4. The optical fiber according to claim 1, wherein
   a zero-dispersion wavelength is equal to or larger than 1300 nm and equal to or smaller than 1324 nm, and
   a dispersion slope at the zero-dispersion wavelength is equal to or smaller than 0.092 ps/nm$^2$/km.

5. The optical fiber according to according to claim 1, wherein
   Δ1-ΔClad is equal to or larger than 0.34% and equal to or smaller than 0.40%, and
   \|Δ3-ΔClad\| is equal to or smaller than 0.26%.

6. The optical fiber according to claim 1, wherein Δ2-ΔClad is equal to or larger than −0.05% and equal to or smaller than 0.05%.

7. The optical fiber according to claim 1, wherein
   assuming that 2a represents a core diameter of the central core portion, 2b represents an inner diameter of the trench layer, and 2c represents an outer diameter of the trench layer,
   b/a is equal to or larger than 1.8 and equal to or smaller than 4.0, and
   c/a is equal to or larger than 3.4 and equal to or smaller than 7.0.

8. The optical fiber according to claim 1, wherein a core diameter of the central core portion is set such that a cable cutoff wavelength is equal to or larger than 1000 nm and equal to or smaller than 1260 nm.

9. The optical fiber according to claim 1, wherein the central core portion is made of silica based glass that is doped with at least one of chlorine (Cl), fluorine (F), potassium (K), and sodium (Na).

* * * * *